United States Patent Office 3,001,862
Patented Sept. 26, 1961

3,001,862
METHOD FOR REDUCING THE MOISTURE CONTENT OF CROPS
Frank J. Sowa, 305 E. 46th St., Cranford, N.J.
No Drawing. Filed July 28, 1954, Ser. No. 446,423
2 Claims. (Cl. 71—2.7)

This invention relates to methods and means for removing moisture from crops for the purpose of aiding in the maturing, curing, harvesting, or storing of the crops treated. The invention is directed particularly to methods wherein chemical compositions are applied to crops or vegetation for the purpose of reducing the moisture content thereof, or hastening the removal of moisture.

Hay and other crops or vegetation are generally cured or allowed to mature or ripen in the field under the action of the sun and wind. However, weather conditions influence the maturing and removal of moisture from hay to such an extent that it is impossible to schedule mowing, harvesting or bailing operations. In humid sectors of the United States where rainfall is frequent it is always a problem to cure hay in the field. The addition of a chemical to speed the rate of curing enhances the solution of the problem. Uniform ripening of legumes and cereal crops such as alfalfa, bird's-foot trefoil, clover species, soybeans and field beans, rice, wheat, corn and others is enhanced by preliminary drying of the leaves previous to harvest. If the weather is hot and dry the hay or crops may mature early, whereas a prolonged wet, humid period may cause considerable delay in the harvesting of the crop. Therefore, it frequently becomes necessary to harvest the crop at times when the weather is unfavorable or the farmer is engaged in other important tasks.

Many problems are also encountered due to the mildewing of hay or crops after they have been harvested particularly when the crops are harvested while in a green state or, in the event they should be damp due to the rain or dew. If hay should mildew it not only becomes less fit for use by cattle but also presents a serious fire hazard due to the heat generated upon the growth and oxidation of mildew and the decomposition of the crop.

It has further been found that in many cases the nutrient value of some crops is substantially higher when it is harvested at earlier growth stages in comparison to more mature stages.

It has now been discovered that hay and other crops can be treated with compositions which promote the curing for maturing of the hay while it is standing or after it has been mowed. This is preferably accomplished by spraying onto the hay crops or other products to be harvested, or at the time of harvest, a composition containing an aqueous solution or suspension of a branched chain aliphatic acid or an ester, amide, or alkaline salt thereof.

One of the objects of the persent invention is to promote the drying of crops for the purpose of facilitating the maturing, curing, harvesting, or storing thereof.

Another object of the invention is to promote drying or maturing of crops while standing in a field.

A further object of the invention is to provide methods whereby hay crops and other vegetation may be treated so as to reduce the moisture content thereof.

A specific object of the present invention is to provide methods wherein branched chain aliphatic acids and their esters, amides, or ammonium, amine alkaline salts are applied to crops in a manner to promote drying and/or curing of the crops and facilitate in the maturing, harvesting, or storing thereof.

These and other objects and features of the present invention will appear from the following description thereof in which reference is made to specific compositions and methods of use for the purpose of indicating the nature of the present invention but without intending to limit the invention thereto.

The present invention is particularly adapted for use in promoting the curing and/or drying of hay and will be described in connection therewith. However, it should be understood that the invention is equally applicable for use in treating other crops or vegetation whenever it is desired to reduce the moisture content thereof. Furthermore, it should be understood that the present invention is adapted for use in the treatment of hay or crops standing in a field, and also may be employed in treating cut or harvested hay to facilitate curing and to prevent or reduce the growth of mildew and rotting or decomposition of the products. The present invention has been found to be useful in the treatment of perennials such as timothy and alfalfa and biennials, sweet clover, red clover and alsine. It may also be employed in the treatment of other crops to improve the properties of grain from rye, rice, oats, or wheat, or to control the moisture content of corn, ensilage, and the like.

In treating any crops of vegetation, whether standing in the field or cut or harvested, an aqueous solution or suspension of a branched chain aliphatic acid, or an ester, amide, ammonium, amine, or alkaline salt of such acid is applied to the crops preferably by spraying in a controlled manner depending upon the type of the crop being treated and its condition. Instead of using the acid, ester or salt, it is possible to use the polyalkylene oxide condensation products of the branched chain aliphatic acids. In the preferred practice of the invention for treating standing hay in a field, or at the time of cutting, an aqueous solution or dispersion of the active agents is sprayed onto the hay a few hours or a day or so before the hay is to be harvested or at cutting time. The purpose of this practice is to facilitate the curing time of hay and thus reduce the hazards of unfavorable weather. A further purpose is to even further reduce the curing time and hazards such as can be obtained by mechanical means such as hay crushing.

The active ingredients of the composition employed in the practice of the present invention consist of or include branched chain monocarboxylic acids together with the esters, polyalkylene oxide condensation products, amides and ammonium, amine or alkaline salts thereof. It has been found that the aliphatic acids which contain branched chains are generally more effective than are the unsaturated or straight chain aliphatic acids. Thus, isobutyric, 2-ethylbutyric and 2-ethylhexanoic acids are particularly useful in the practice of the present invention.

In addition to the acids themselves, substantially any of the esters of the above acids may be used such as the methyl, ethyl, butyl, pentyl, octyl, myristyl and lauryl esters. Hydroxy esters further may be used as exemplified by the polyalkalene oxide condensation products with the acids indicated above. Further, the amides can be used as exemplified by N,N, di-(2-hydroxyethyl) hexanoamide.

Alkaline salts of the acids indicated above may also be employed and the term "alkaline salts" is intended to include and consist of the sodium, potassium, ammonium, and amine salts of the acids. Typical of such alkaline salts are ammonium 2-ethylhexanoate, dimethylammonium 2-ethylhexanoate, triethanolammonium 2-ethylhexanoate, laurylammonium 2-ethylhexanoate.

In most cases, it is desirable to use a wetting agent in combination with the active ingredients, such as those cited above. For this purpose, either ionic or non-ionic wetting agents may be employed, such as alkyl sodium sulfosuccinate, alkyl aryl sulfonates, fatty acid sulfonates, and alkyl phenol ethylene oxide condensation products.

The amount and concentration of the active agent employed will vary considerably depending upon the type and condition of the crop being treated as well as the composition of the active agents used. In general, the concentration of the aqueous solution and dispersions employed may vary from about 0.1 to 10.0 pounds per gallon of water used although larger amounts may be used when desired. Other or additional solvents such as alcohol also may be used in producing solutions or dispersions. The volume of liquid and the amount of active agent applied per acre will depend not only upon the type and condition of the crop being treated and the agent employed, but further depends upon the type of spraying equipment used. Low volume sprayers had been developed which are capable of applying one to fifty gallons or so of liquid per acre, whereas high volume sprayers may apply as much as from fifty to four hundred gallons per acre.

The amount of the active agent applied is generally from about ½ to 100 pounds per acre depending as indicated upon the character of the crop being treated and the active agent used. Typical quantities when using 2-ethylhexanoic acid will vary from ½ to 50 pounds per acre depending upon the type of carrier used in the spraying equipment, and the density, growth and type of the crop.

In order to illustrate typical practice in accordance with the present invention, the following example is cited. In each case the hay treated was alfalfa, as well as mixed legumes, approximately 12 inches tall and the tests were applied to strips 21 inches wide and 3 feet long. To each strip there was applied 400 cc. of composition produced by dissolving 220 parts of 2-ethylhexanoic acid, 100 parts of a wetting agent and 110 parts of isopropyl alcohol in water—the rate of application being equivalent to 50 pounds of active ingredient per acre. The application to the hay was made at 11:00 a.m. and successive samples were harvested from each strip at 12:00 noon, 1:00 p.m., 2:00 p.m., and 4:00 p.m. The weights of all alfalfa samples were taken immediately after cutting and the samples were placed in a drier to determine the moisture content thereof. The results obtained are indicated in the following table:

pecially effective. If desired, two or more active agents may be employed in combination and the crops may be given two or more successive sprayings with the selected compositions if desired. In any event, the particular active agents used may be varied depending upon the character of the hay or crops being treated.

The active agent may be supplied to the user in the form of a dry powder or liquid form as a concentrate for dilution prior to application. Typical of the compositions, which can be supplied in this form are the following:

| | G. |
|---|---|
| Laurylammonium 2-ethylhexanoate | 220 |
| Isopropyl alcohol | 220 |
| 2-ethylhexanoic acid | 220 |
| Igepal 300 | 110 |
| Isopropyl alcohol | 110 |

Any of the foregoing mixtures can be dissolved or suspended in water to the desired concentration depending upon the character of the spraying equipment which will be used. When spraying on hay or other crops of vegetation in the amount of from ½ pound to 100 pounds of active ingredient per acre, the crops are found to be markedly reduced in their moisture content, generally in amounts of from 5 to 20% or more within a period of a few hours. The drying effect is increased with a rise in temperature and accordingly, the amount of composition required for use on a hot summer day will be less than that needed when applied on a cold damp day. A convenient method of application is to spray the hay just prior to or during the harvesting operation.

In the alternative, hay which has been cut and crushed by mechanical means, the removal of moisture may be hastened by the chemicals claimed in this patent.

The compositions of the present invention are also useful for desiccation and/or defoliation of the leaves of soybeans, castorbeans, cotton, small-seeded legumes such as alfalfa, red clover, bird's-foot trefoil, white clover and others. Also for the desiccation of the leaves of cereal grains (such as rice, wheat, etc.) with subsequent uniform drying and maturing of the grain directly in the field.

While it is generally desirable to apply the compositions of the present invention in the form of aqueous solu-

| Temp., ° | Time | Untreated | | | Treated | | | Difference, Dry Material Gain by Treating percent |
|---|---|---|---|---|---|---|---|---|
| | | Green | Dry | Dry Material Content, percent | Green | Dry | Dry Material Content, percent | |
| 61 | 12:00 | 878 | 212 | 24.1 | 653 | 170 | 26.0 | 1.9 |
| 63 | 1 p.m. | 968 | 235 | 24.2 | 639 | 174 | 27.2 | 3.0 |
| 63 | 2 p.m. | 792 | 193 | 24.3 | 747 | 216 | 28.9 | 4.6 |
| 60 | 3 p.m. | 706 | 174 | 24.6 | 752 | 223 | 29.7 | 5.1 |

There was little difference in color of the dry samples but over 5% of drying was effected in 5 hours. The day being relatively cool, the rate of drying was retarded and from experience it can be reasonably estimated that the extent of drying which would result from the same treatment on a hot summer day at temperatures approaching 90° F. the composition described would produce nearly 20% drying of the hay treated.

In addition to the product as indicated in the above table, laurylammonium 2-ethylhexanoate was very effective among the alkaline salts of the branched chain aliphatic acids. The branched chain aliphatic acids, such as 2-ethylhexanoic acid, not only caused moisture removal of the leaves but also showed activity in moisture removal from the stems of the hay treated in accordance with the present invention. Other branch chain acids and their esters and alkaline salts also appear to be estions, they can, where permissible, be dissolved in organic solvents such as alcohol or hydrocarbon solvents or in the form of aqueous emulsions wherein the active agent is dissolved in a hydrocarbon solvent.

The foregoing methods of employing the present invention and the compositions cited and recommended for use are capable of many variations and have been referred to for purposes of illustration. However, compositions and methods of using the same can be altered considerably and in view thereof, it should be understood that the particular examples cited are intended for purposes of illustration and are not intended to limit the scope of the invention.

What I claim is:

1. The method of treating crops preparatory to harvesting thereof which comprises the step of spraying onto the standing crops an aqueous solution containing from about 0.1 to 10 pounds per gallon of 2-ethylhexanoic acid together with a wetting agent, said solution being sprayed onto the crops at the rate of approximately ½ to 100 pounds of the active ingredient per acre.

2. The method of reducing the moisture content of crops comprising the steps of spraying onto the crops an effective amount of an aqueous medium containing an active agent selected from the group consisting of 2-ethylhexanoic acid and the esters, amides and alkaline, salts thereof, together with a wetting agent.

References Cited in the file of this patent

UNITED STATES PATENTS

| | | |
|---|---|---|
| 1,497,362 | Dhe | June 10, 1924 |
| 2,393,086 | Bousquert | Jan. 15, 1946 |
| 2,396,012 | Jones et al. | Mar. 5, 1946 |
| 2,535,875 | Stewart | Dec. 26, 1950 |
| 2,617,722 | Mowry et al. | Nov. 11, 1952 |
| 2,626,862 | Zimmerman et al. | Jan. 27, 1953 |
| 2,636,816 | Stewart | Apr. 28, 1953 |
| 2,639,983 | Veldstra | May 26, 1953 |
| 2,649,364 | Raynor et al. | Aug. 18, 1953 |